US010108517B1

(12) United States Patent
Efremov et al.

(10) Patent No.: US 10,108,517 B1
(45) Date of Patent: Oct. 23, 2018

(54) TECHNIQUES FOR DATA STORAGE SYSTEMS USING VIRTUALIZED ENVIRONMENTS

(75) Inventors: Oleg Alexandrovich Efremov, Saint-Petersburg (RU); Artem Akopovich Zarafyants, St. Petersburg (RU); Sergey Zaporozhtsev, Fontanka River Emb (RU); Mark A. Parenti, Milford, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 135 days.

(21) Appl. No.: 13/135,156

(22) Filed: Jun. 27, 2011

(51) Int. Cl.
*G06F 17/30* (2006.01)
*G06F 11/00* (2006.01)
*G06F 11/30* (2006.01)
*G06F 11/32* (2006.01)

(52) U.S. Cl.
CPC ......... *G06F 11/301* (2013.01); *G06F 11/327* (2013.01); *G06F 17/30082* (2013.01)

(58) Field of Classification Search
None
See application file for complete search history.

(56) References Cited

U.S. PATENT DOCUMENTS

| | | | | |
|---|---|---|---|---|
| 7,590,803 B2* | 9/2009 | Wintergerst | .................. | 711/134 |
| 8,086,596 B2* | 12/2011 | Bernardini et al. | .......... | 707/713 |
| 8,364,802 B1* | 1/2013 | Keagy et al. | ................. | 709/223 |
| 8,738,972 B1* | 5/2014 | Bakman | ............. | G06F 11/0712 |
| | | | | 714/47.1 |
| 2004/0073908 A1* | 4/2004 | Benejam et al. | ............. | 718/105 |
| 2007/0239793 A1* | 10/2007 | Tyrrell et al. | ................ | 707/200 |
| 2007/0250838 A1* | 10/2007 | Belady et al. | ............... | 718/105 |
| 2008/0201414 A1* | 8/2008 | Amir Husain | .......... | G06F 9/445 |
| | | | | 709/203 |
| 2009/0217265 A1* | 8/2009 | Ishikawa | .......................... | 718/1 |
| 2009/0265707 A1* | 10/2009 | Goodman et al. | ................ | 718/1 |
| 2010/0011368 A1* | 1/2010 | Arakawa et al. | ............. | 718/104 |
| 2011/0134761 A1* | 6/2011 | Smith et al. | ................... | 370/252 |
| 2011/0296406 A1* | 12/2011 | Bhandari | .............. | G06F 9/5044 |
| | | | | 718/1 |
| 2012/0011508 A1* | 1/2012 | Ahmad | ............................ | 718/1 |
| 2012/0131176 A1* | 5/2012 | Ferris | .................... | G06F 9/5072 |
| | | | | 709/224 |
| 2013/0139160 A1* | 5/2013 | Yahalom et al. | ................ | 718/1 |

* cited by examiner

*Primary Examiner* — Charles D Adams
(74) *Attorney, Agent, or Firm* — Muirhead and Saturnelli, LLC

(57) ABSTRACT

Described are techniques for using resources of a data storage system. The data storage system is configured to have a first data storage configuration including a first extendable resource. The data storage system is configured to execute a virtual machine and one or more applications executing in the context of the virtual machine. One or more metrics are monitored regarding any of data storage system resource utilization and performance. It is determined whether the one or more metrics comply with specified criteria. If the one or more metrics do not comply with the specified criteria, processing is performed that includes providing a notification in connection with migrating any of the virtual machine and data used by the virtual machine from the data storage system.

22 Claims, 7 Drawing Sheets

| Time | Initial configuration at purchase | 1 year later | 2 years later |
|---|---|---|---|
| Data storage System Capacity | 1 DAE (e.g., 15 disks or 15TB) | 4 DAEs (e.g., 60 disks or 60TB) | 8 DAEs (e.g. 120 disks or 120TB) |
| VMs | 6 VMs | 2 VMs | 0 VMs |
| External Hosts / Servers Utilized | 0 (all on data storage system) | 1 physical host/server | 2 physical hosts/servers |

FIGURE 3

TECHNIQUES FOR DATA STORAGE SYSTEMS USING VIRTUALIZED ENVIRONMENTS

BACKGROUND

Technical Field

This application generally relates to data storage systems, and more particularly to techniques used in connection with management of data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A data storage system may be initially configured with a first set of storage devices. During the lifetime of the storage system, additional storage devices may be added up to a maximum number of such storage devices. However, there are other resources of the storage system, such as storage processors, which may not be expanded or added to beyond that which is included in the initial configuration. As such, the data storage may be initially configured with storage processors designed to optimally function based on the maximum number of storage devices. When the data storage system is configured to have less than the maximum number of storage devices, the storage processors may be underutilized.

SUMMARY OF THE INVENTION

In accordance with one aspect of the invention is a method for using resources of a data storage system comprising: configuring the data storage system to have a first data storage configuration, the first data storage configuration including a first extendable resource; configuring the data storage system having the first data storage configuration to execute a virtual machine and one or more applications executing in the context of the virtual machine; monitoring one or more metrics regarding any of data storage system resource utilization and performance; determining whether the one or more metrics comply with specified criteria; and if the one or more metrics do not comply with the specified criteria, performing processing including providing a notification in connection with migrating any of the virtual machine and data used by the virtual machine from the data storage system. The first extendable resource may be a data storage device and the first data storage configuration includes a first set of data storage devices. The first data storage configuration may be extended to include an additional set of one or more storage devices. The one or more metrics may include at least one utilization metric regarding a non-extendable resource of the data storage system. The one or more metrics may include a first metric regarding CPU utilization and a second metric regarding memory utilization and the specified criteria includes a first threshold indicating a threshold amount of CPU utilization and a second threshold indicating a threshold amount of memory utilization. The one or more metrics may include a first metric that indicates a maximum CPU utilization observed during a time period, a second metric that indicates a maximum memory utilization during the time period and the one or more metrics, a third metric that indicates an average CPU utilization observed during the time period and a fourth metric that indicates an average memory utilization observed during the time period, and the specified criteria may indicate to migrate the virtual machine from the data storage system when all of the first metric, the second metric, the third metric and the fourth metric are more than specified thresholds. Migrating any of the virtual machine and data used by the virtual machine from the data storage system may be performed automatically in response to determining that all of the first metric, the second metric, the third metric and the fourth metric are more than the specified thresholds. Migrating any of the virtual machine and data used by the virtual machine from the data storage system may be performed automatically in response to determining that all of the first metric, the second metric, the third metric and the fourth metric are more than the specified thresholds and additionally receiving user confirmation to proceed with the migrating. Migrating any of the virtual machine and data used by the virtual machine from the data storage system may include migrating the virtual machine for execution on a processor of another system external to the data storage system. The migrating any of the virtual machine and data used by the virtual machine from the data storage system may include migrating the virtual machine for execution on a processor of another system external to the data storage system without migrating at least a portion of data used by the virtual machine or an application executing in the context of the virtual machine. Migrating any of the virtual machine and data used by the virtual machine from the data storage system may include migrating at least a portion of first data used by the virtual machine or an application executing in the context of the virtual machine to another system external to the data storage system. Migrating any of the virtual machine and data used by the virtual machine from the data storage system may include migrating at least a portion of first data used by the virtual machine or an application executing in the context of the virtual machine to another system external to the data storage system without migrating the virtual machine for execution on the another system external to the data storage system. The method may include performing trend analysis using observed data to predict a point in time as to when the one or more metrics will not comply with specified criteria; and providing a user notification regarding the point in time. A connection may be established between the data storage system and a host having a virtualized environment. The method may include automatically detecting the connection and the virtualized environment of the host; and providing an option for automatically migrating the virtual machine to the host upon detecting the connection and the virtualized environment. The method may include selecting one or more virtual machines currently executing on the data storage system for migration to the host, and wherein the host is selected from a plurality of hosts connected to the data storage system. The method may include providing data protection services for the data storage system, said providing including first processing to replicate first data for the virtual machine and second processing to replicate second data not used by the virtual machine, wherein said first data includes any of an image of the virtual machine and data used to execute the virtual machine on another data storage system.

In accordance with another aspect of the invention is a computer readable medium comprising code stored thereon for using resources of a data storage system, the computer readable medium comprising code stored thereon for: configuring the data storage system to have a first data storage configuration, the first data storage configuration including a first extendable resource; configuring the data storage system having the first data storage configuration to execute a virtual machine and one or more applications executing in the context of the virtual machine; monitoring one or more metrics regarding any of data storage system resource utilization and performance; determining whether the one or more metrics comply with specified criteria; and if the one or more metrics do not comply with the specified criteria, performing processing including providing a notification in connection with migrating any of the virtual machine and data used by the virtual machine from the data storage system. The first extendable resource is a data storage device and the first data storage configuration may include a first set of data storage devices. The first data storage configuration may be extended to include an additional set of one or more storage devices. The one or more metrics may include a first metric regarding CPU utilization and a second metric regarding memory utilization and the specified criteria may include a first threshold indicating a threshold amount of CPU utilization and a second threshold indicating a threshold amount of memory utilization.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 is an example illustrating system configuration changes at various points in time;

DETAILED DESCRIPTION OF EMBODIMENT(S)

Figure 1:
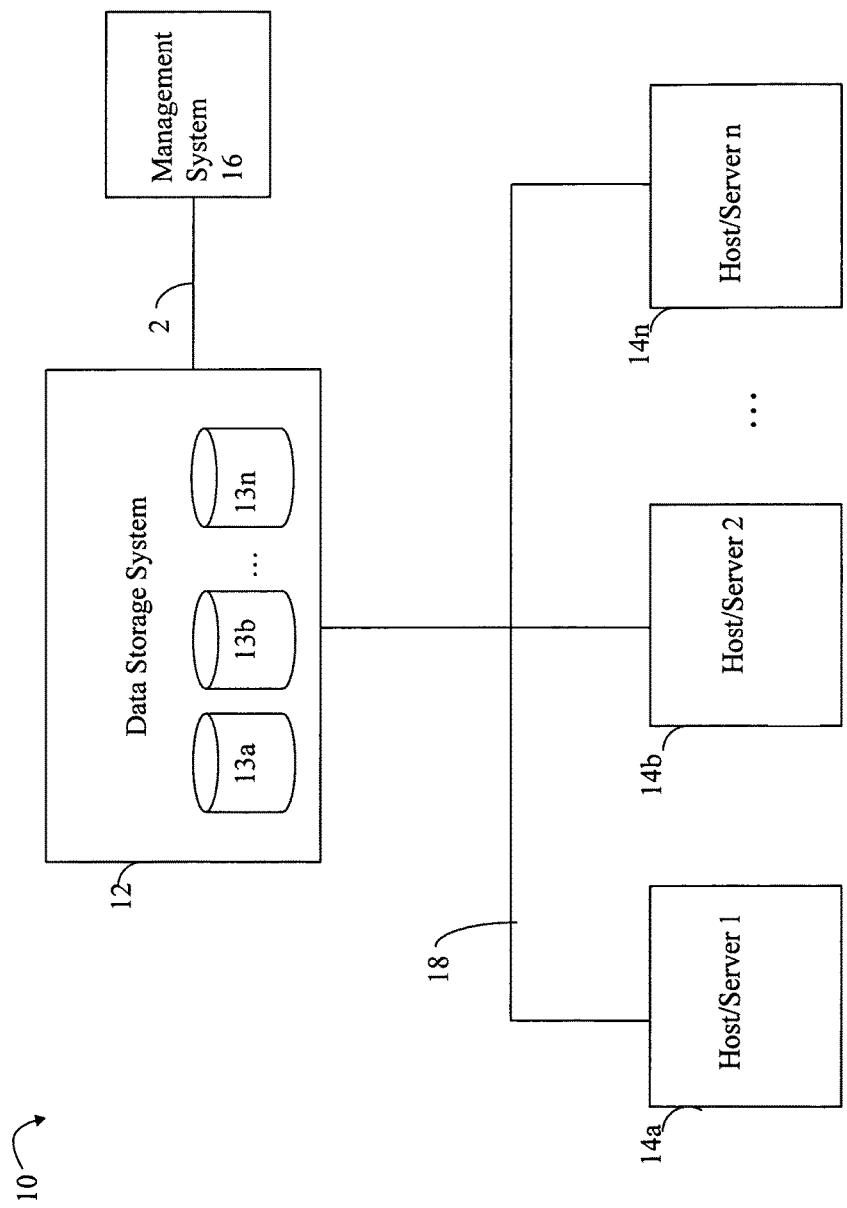
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like. It should be noted that although the management system 16 is illustrated as a separate system from the data storage system 12, some or all of the functionality performed by the system 16 as described above (e.g., such as for data storage system management) may actually be performed by code executing on the data storage system 12. In such an embodiment, there may not be a separate management system 16. Rather, operations performed by the management system 16 may be incorporated into code that executes on the data storage system 12.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, may provide network attached storage (NAS), or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
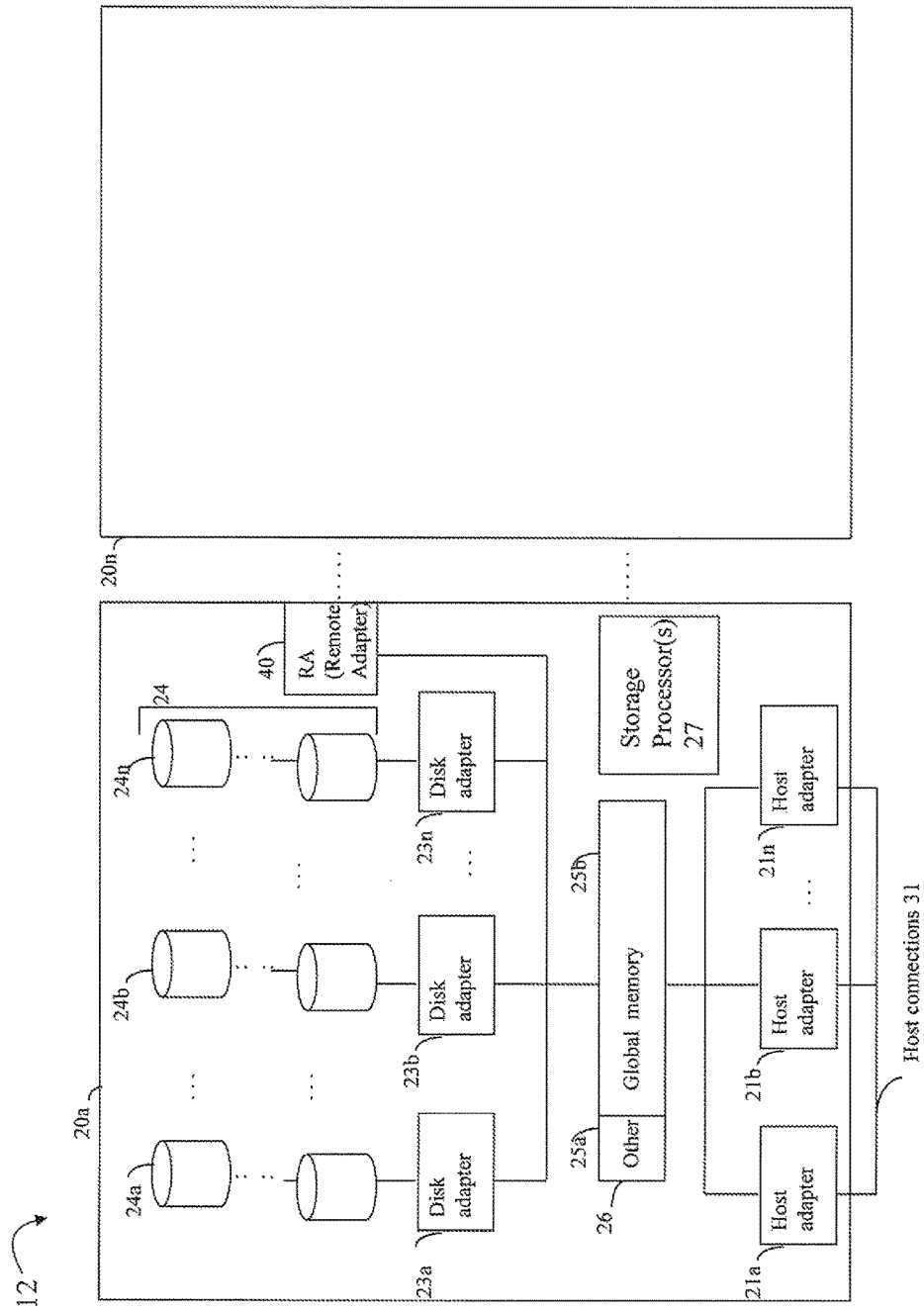
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein.

Components of the data system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

A data storage system may have a configuration which ranges from a minimum configuration to a maximum configuration with respect to one or more components or resources. For example, a data storage system may support up to a maximum number of data storage devices having a total maximum storage capacity. The data storage system may be configured to have a varying number of such storage devices from a minimum number to the maximum. In a similar manner, the data storage system may be configured to have, or otherwise support up to, a maximum number of other components or resources.

A data storage system may be characterized as including components or resources that fall into two general categories —a first category in which the components in this category are extendable or expandable and a second category in which the components in this category are not extendable or expandable. Those components which are extendable may be extended or added to an initial configuration as time progresses during the typical usage lifecycle of the data storage system. For example, data storage devices such as disks, disk array enclosures and connectivity components used to connect disks to CPUs, and other components may be characterized as extendable components. A data storage system may include an initial set of storage devices having a first capacity. As the data storage system is used over time, the customer's storage demands may increase and additional storage devices may be added as the additional storage capacity is needed. The data storage system may also include components which are characterized as non-extendable which cannot be later added to an initial DS configuration. Examples of components which may be considered as non-extendable depending on the particular data storage system may include, for example, a number of CPUs and an amount of memory (e.g., such as RAM for caching and other uses by the storage system). Additional non-extendable components cannot typically be added subsequent to an initial configuration of the data storage system. At the time of purchase, a data storage system may include an initial configuration of all components including those which are extendable and those which are not extendable. As time progresses the customer may add additional storage devices and other extendable components. However, the customer is not able to add additional CPUs, memory and other non-extendable resources to the initial configuration as time progresses. As such, the initial data storage system may be configured to include an amount of non-extendable components, such as CPU and memory, to work with a maximal configuration of extendable resources thereby accommodating the expected expansion of the extendable resources over time up to an expected or predefined maximum. For example, a data storage system may support up to a maximum number of data storage devices having a maximum capacity. The initial data storage system configuration may include less than this maximum number of storage devices. However, the initial data storage system may be configured to have a certain amount of non-extendable resources, such as CPUs and memory, able to accommodate up to the maximum amount of storage devices since such non-extendable resources may not be added subsequent to the initial data storage system configuration. In this case, the non-extendable components may be underutilized in data storage system configurations other than a maximal configuration. Thus, the full capabilities of the non-extendable resources, such as CPU and memory, may not be needed in connection with data storage system processing tasks such as servicing I/O requests directed to the storage devices until the data storage system is actually configured in accordance with a maximum configuration (e.g, includes the maximum number of storage devices). Until the non-extendable resources are needed in connection with this maximum configuration, the non-extendable resources may be underutilized and may therefore be used more efficiently in connection with performing other processing and tasks when the data storage system has a less than maximum configuration.

Described herein are techniques that may be used in connection with utilizing the data storage system resources, such as the non-extendable resources of the data storage system, more efficiently such as when the data storage system has a less than maximum configuration or may otherwise not be utilizing all capabilities of its own resources for its own processing purposes. As will be described in more detail below, the data storage system may include a virtualized environment used for performing tasks other than for those of data storage system (e.g., other than when performing data storage system tasks such as, for example, for processing and servicing received I/O operations of the data storage system). This provides the customer with the option of using the data storage system resources, in particular the non-extendable resources, more efficiently when such resources may otherwise not be used to their fullest capabilities for data storage system purposes. Generally, non-data storage system processing tasks with respect to a data storage system may be processing that is not performed for the data storage system. Rather, in connection with techniques herein using the virtualized environment, the data storage system may serve as a surrogate or host upon which a task is performed for another entity, such as offloaded from a host or server computer system, or from another data storage system.

It should be noted that in connection with data storage systems particular components, such as CPU and memory, may be characterized as non-extendable (e.g., are not added subsequent to an initial configuration) rather than extendable (e.g., may be added or extended subsequent to an initial configuration) since adding the resources after the initial configuration may require a specially qualified service technician. Additionally, with particular components such as CPUs and memory, may not be added subsequent to an initial configuration due to a risk of damage, such as with respect to existing components of the data storage system. Thus, it may not be desirable or feasible to add components characterized as non-extendable in a data storage systems subsequent to an initial configuration at purchase.

The techniques herein may utilize a virtualized environment using virtual machines (VMs) to facilitate better utilization of data storage system resources, such as the non-extendable resources including CPU and memory, when the data storage system has a less than maximum configuration. In this case, the customer may utilize VMs which execute on the data storage system and use resources thereof to perform tasks other those than in connection with data storage system processing tasks (e.g., processing commands received by the data storage system). As the data storage system configuration may grow or be expanded to include more storage devices resulting in an increasing number of I/O operations, the VMs utilized for non-data storage system tasks may be migrated or otherwise removed from the data storage system as the data storage system resources are needed for use with increasing demands for the data storage system processing tasks. In this manner, the portion of the data storage system resources which may be unused or underutilized at a first point in time may be used for non-data storage system processing. As time progresses and the demand and usage of the data storage system resources for data storage system processing tasks increases, the data storage system resources may be reallocated for use with data storage system tasks rather than non-data storage system tasks. As the demand for the data storage system resources increases for use with data storage system processing, non-data storage system processing tasks may be offloaded such as by removal or otherwise migrating the one or more VMs of the data storage system performing the non-data storage system processing elsewhere. The VM may be migrated to another system other than the data storage system currently executing the VM. For example the VM may be migrated to another data storage system, an external server or host, and the like.

As an example, VMs may execute using one or more storage processors of a single data storage system using virtualization software produced by VMware, Inc. In the context of each virtual machine, one or more applications may be executed that generally provide any service that may be utilized by a client. For example, the applications may include any one or more of an email application such as Microsoft Exchange, a web server, a proxy server, a DHCP server, a database application, and the like. Each VM may utilize its own set of data that is located on a same device or a different device than data used by other VMs. In the context of a virtualized environment of the data storage system in which the data storage system executes a VM hosting such an application to perform a non-data storage system task, the application may also be referred to as a VM-hosted application executing on the data storage system. More generally, the application executing in the virtualized environment in the context of a VM may be referred to as a VM-hosted application. As will be described in more detail below, the VM-hosted application may also be executed in a virtualized environment on an external server (e.g., external with respect to the data storage system).

As an example, consider a data storage system having an initial configuration with a minimum number of storage devices. The data storage system is initially configured with an amount of memory and number of CPUs able to accommodate DS processing with the maximum number of storage devices. Thus, the memory and CPUs may be underutilized with the minimum number of storage devices and may be used at this time in connection with performing non-data storage system processing tasks. As the customer adds additional storage devices, the demand and utilization of the CPUs and memory of the data storage system to service such I/Os and perform other tasks for its own maintenance may increase. In response, as the demand and utilization of data storage system resources for data storage system related tasks increases, the VMs utilizing the data storage system resources for other purposes may be accordingly migrated thereby decreasing the demand and utilization of data storage system resources for such other purposes.

To further illustrate the foregoing, reference is made to FIG. 3. In the example 100, shown is a table including configuration information at different points in time indicated in row 109. Each column of the table indicates configuration information at a different point in time. Column 104 indicates configuration information based on the initial configuration when the data storage system is purchased. Column 106 indicates configuration information a year later after the initial purchase. Column 108 indicates configuration information two years after the initial purchase. The configuration information includes, for each point in time, the data storage system capacity in row 110, the number of VMs executing in the data storage system 112 and the number of external hosts or servers utilized 114. Column 104 indicates an initial configuration where the data storage system has a single disk array enclosure (DAE) or back end disk enclosure of 15 storage devices and 6VMs execute on the data storage system. Additionally, in connection with the initial configuration, the data storage system is connected to 0 hosts or servers and all applications execute in the context of VMs on the data storage system rather than on external hosts or servers. At a second point in time 1 year later, column 106 indicates the customer has added additional storage devices so that the data storage system includes 4 DAEs with a total of 60 storage devices providing a total storage capacity of 60 TBs, 2VMs execute on the data storage system, and the data storage system is connected to 1 host or server. As will be described in more detail in following paragraphs, responsive to the additional storage added at year 1 as indicated in column 106 thereby increasing demand and utilization of data storage system resources, 4 VMs and their applications have been migrated to the single external host or server. At a third point in time 2 years after purchase, column 108 indicates the customer has added additional storage devices so that the data storage system includes a total of 8 DAEs providing a total of 120 storage devices with a storage capacity of 120 TBs, 0 VMs execute on the data storage system, and the data storage system is connected to 2 hosts or servers. As will be described in more detail in following paragraphs, responsive to the additional storage added at year 2 as indicated in column 108 thereby further increasing demand and utilization of data storage system resources, all VMs and their applications have been migrated from the data storage system to two external hosts or servers.

Figure 4:
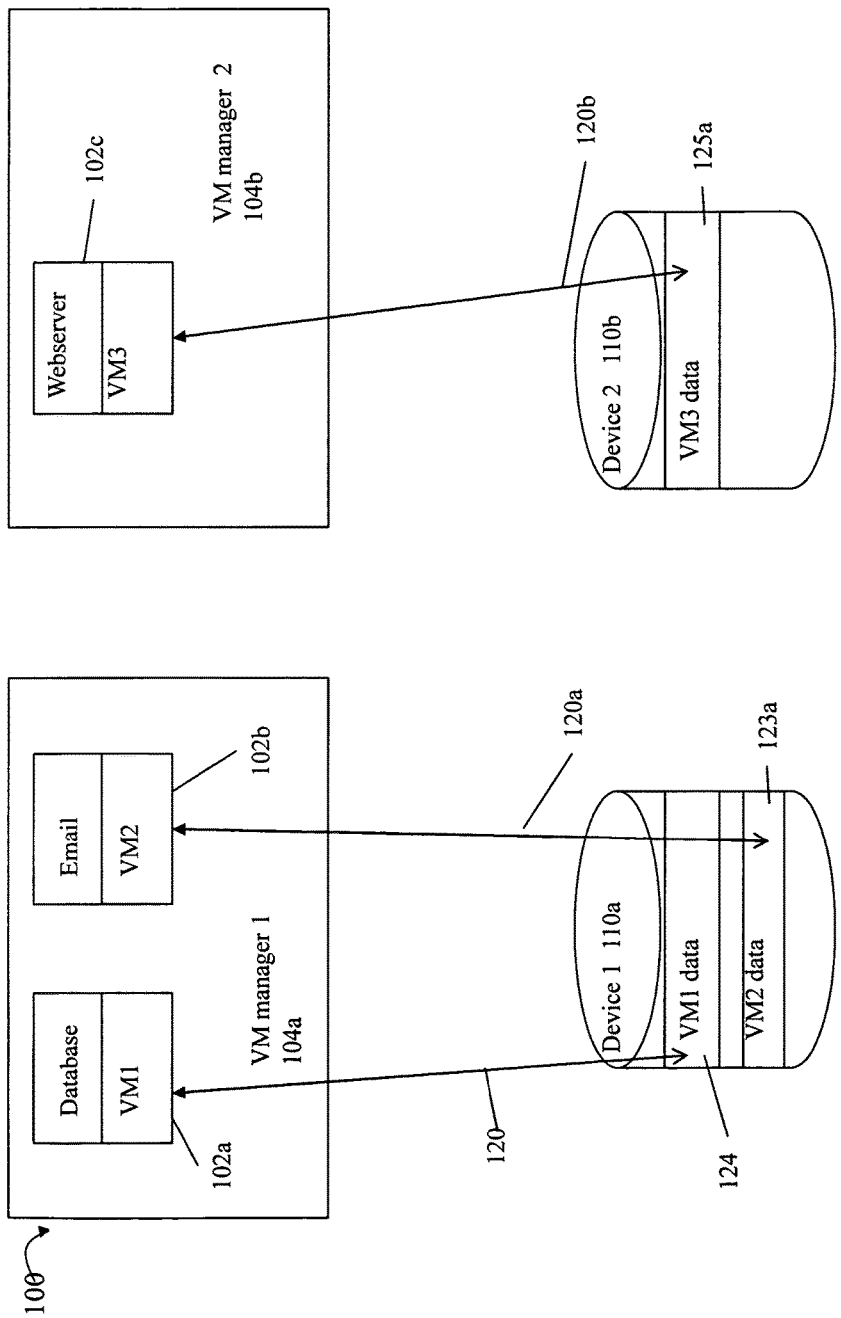
FIGS. 4-6 are examples illustrating use of the techniques described herein.

Referring to FIG. 4, shown is an example of VMs as may execute on a single data storage system, such as a single data storage array, in an embodiment in accordance with techniques herein. The example 100 includes VM 1 102a and VM2 102b managed by VM manager 1 104a. VM3 102c is managed by VM manager 2 104b. Each of 104a, 104b may be a hypervisor that performs VM management in connection with multiple VMs such as VMware ESX Server by VMware, Inc. Such a hypervisor, or more generally, VM manager, may be installed and run directly on server hardware without requiring an underlying operating system. Each of the VM managers 104a, 104b may perform management of the underlying server's physical resources for use among the multiple VMs that can run simultaneously. In this example, a database application is executed by VM1 102a, an email application is executed by VM2 102b and a webserver is executed by VM3 102c.

Each VM may access data used in connection with the VM and also for the application executed in the context of the VM. For example, as illustrated by element 120, VM 1 102a accesses its data, VM1 data, stored at location 124 of device 110a. As illustrated by element 120a, VM 2 102b accesses its data, VM2 data, stored at location 123a of device 110a. As illustrated by 120b, VM 3 102c accesses its data, VM3 data, stored at location 125a of device 110b. The VM (virtual machine) data used by a VM may include data used by the particular application executing on the VM (e.g., database data and log files for a database application executing on a VM such as VM 1 102a) as well as VM metadata regarding the VM's own state, configuration, and execution context such as, for example, data stored in memory, CPU registers, swap files, log files, and the like.

In accordance with techniques herein as will be described in more detail below, a VM and the application executing therein, may be migrated from the data storage system to another system, such as, for example, another computer system (e.g., such as a host or server), another data storage system (e.g., such as another data storage array), and the like. In connection with performing the migration of the VM, such migration may include migrating execution of the VM such that the VM, along with the VM-hosted application, are executed on another system. The migration of the VM may also include migrating from the data storage system the VM data used by the VM as related to its own execution state, context and the like, as well as data used by the particular VM-hosted application. To further illustrate in connection with migrating a VM from a data storage system to an external component, such as a host or server system as described herein, the VM (and VM-hosted application) and/or its VM data may be migrated the host. In other words, in a first case, both the VM (e.g. including the image of the virtual machine) and its VM data may be migrated to the host (e.g., the VM may be migrated to execute on the host and additionally, the VM data used by the VM is also relocated to the host). As a variation to migrating both the VM for host execution and the VM's data to the host, either the VM or the VM data may be migrated separately and independently of the other so that, for example, the VM data or the VM may be migrated to the host but not the other. It should also be noted that all, or a portion of less than all, of the VM data may also be migrated. If just the VM is migrated for execution from the data storage system to the host, the VM executing on the host may continue to access and use VM data stored on the data storage system. If just the VM data is migrated from the data storage system to the host, the VM may continue to execute on the data storage system and use the VM data now stored on the host. In any case, the VM may need to be appropriately configured to correctly access its VM data depending on where such VM data is located. Additionally, if a VM-hosted application is migrated as a result of migrating the VM hosting the particular application, any clients using the VM-hosted application are also reconfigured to access the migrated VM and its VM-hosted application at the target migration system. For example, if the VM and VM-host application are migrated but data used by the application remains on the data storage system, the VM and VM-hosted application of the host/server need to be so configured to access the VM data on the data storage system. Furthermore, as will be appreciated by those of ordinary skill in the art, there are instances where a client, such as a host, using a service provided by the VM-hosted application does not have to be reconfigured after the above-mentioned migration of the VM-hosted application to a target system.

It should be noted that the foregoing VM data migration or movement in connection with techniques herein may be performed using facilities available for the particular VM framework and architecture used in an embodiment. For example, an embodiment using VMs and a VM framework and architecture by VMware, Inc., may use Storage vMotion to migrate VM data. VM data transfers may be triggered under the instructions issued by a VM manager. In one embodiment utilizing SCSI commands, the Storage vMotion may issue commands, such as XCOPY (or extent copy) command, to copy the relevant data from a source device to a target device.

Figure 5:
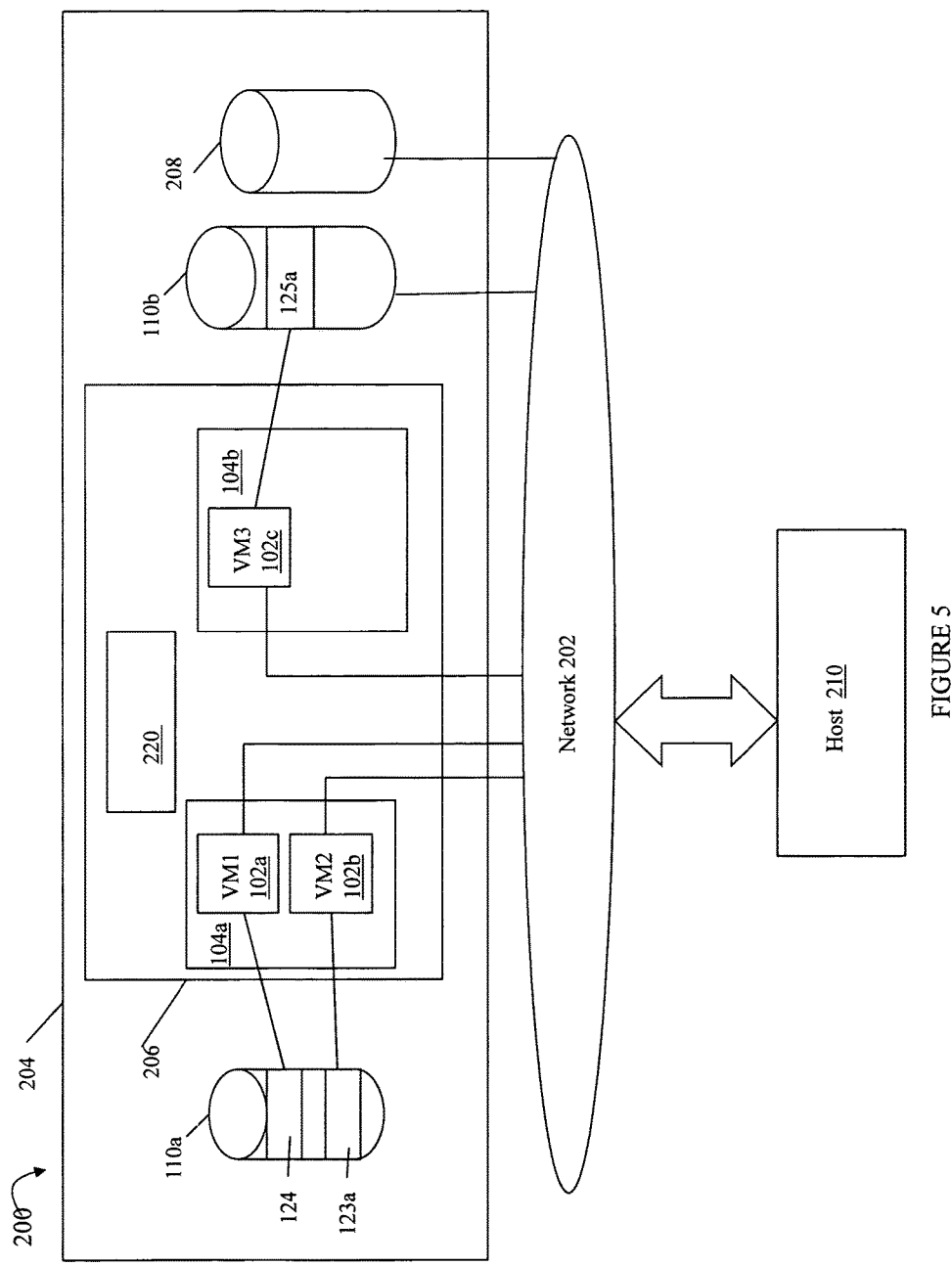

Referring to FIG. 5, shown is an example illustrating how a system may be configured in an embodiment in accordance with techniques herein. The example 200 includes a data storage system 204 configured in accordance with the VMs as described and illustrated in FIG. 4. In the example 200, the VMs 102a-102c may execute on a single storage processor 206 of the data storage system 204. The system 204 may include storage devices 110a, 110b and 206. As described above, VM 102a may access its VM data stored at 124 of device 110a, VM 102b may access its VM data stored at 123a of device 110a, and VM 102c may its VM data stored at 125a of 11b. The data storage system 204 may be configured to expose VMs 102a, 102b and 102c to the host 210 over the network 202 so that the host, as a client, may utilize the services provided by the VMs 102a-102c. Additionally, storage device 208 may be exposed and available to the host 210 for I/O processing such as for other applications (not illustrated) executing on the host 210. The host 210 may connect and use the services provided by each VM using any one of a variety of different suitable software communication options such as, for example, using SSH (secure shell), Telnet, FTP (file transfer protocol), a RDP (remote desktop services such as may be provided in a Windows-based environment), HTTP, and the like.

The example 200 may illustrate a configuration of the data storage system 204 where all applications providing services are executed through VM-hosting on the data storage system. Subsequently, the customer may add additional storage devices (not illustrated) which result in increased demand, consumption and utilization of data storage system resources such as CPU and memory. Management software 220 of the data storage system may monitor and evaluate data storage system resources over time such as at defined periodic intervals. For example, the management software 220 may monitor and evaluate one or more metrics such as may be related to any of resource consumption, resource utilization, and/or data storage system performance. The one or more observed metrics may be measured or evaluated in accordance with one or more growth thresholds of configuration growth criteria, or more generally criteria. The one or more metrics that may be monitored may any of, for example, the total amount of storage capacity of all devices, the total number of storage devices, CPU utilization over a time period, memory utilization over a time period, I/O throughput (e.g., number of I/O operations processed during a time period), I/O service time, I/O response time, amount of data read and/or written during a time period, and the like. The configuration growth criterion/criteria may specify one or more thresholds for the one or more metrics. Additionally, an embodiment may implement weighting in connection with such criteria in determining whether to remove or migrate VM-hosted applications from the data storage system. When the software determines that one or more of such thresholds have been reached, the software may perform processing to accordingly notify the user and/or automatically migrate or otherwise remove one or more of the VMs and VM-hosted applications (e.g., non-data storage system processing tasks) currently executing on the data storage system.

In one embodiment, the growth criteria may specify average and peak utilization rates or thresholds for both CPU and memory utilization (e.g., four thresholds in total). For example, the average CPU threshold may be 50%, the average memory threshold may be 50%, the peak CPU threshold may be 85% and the peak memory threshold may be 85%. When usage for a data storage system for a particular time period meets and/or exceeds all of the foregoing (or otherwise any combination of one or more of the foregoing), the system may provide for user notification and automated removal or migration of one or more VM-hosted applications from the data storage system. In an embodiment, the system may be proactive in that data storage system resource utilization may be monitored over time and, based on past trends or history (e.g., trend analysis), the system may predict a future point in time at which established thresholds may be reached thereby indicating that VM-hosted applications should be migrated or removed from the data storage system. Such a predicted date may be provided and updated as needed to provide the user with an estimation as to when removal or migration of VM-hosted applications from the data storage system will be needed. This may provide advance notification to the user, for example, to purchase additional external servers to which the VM-hosted applications are migrated from the data storage system.

The growth criteria may also include varying levels of thresholds. For example, two thresholds may be defined for storage capacity—an intermediate threshold and a high threshold. The intermediate threshold may specify a first storage capacity which, when reached, provides the customer with a warning notification and may inquire whether the customer wants to remove/migrate one or more VM-hosted applications. At the high threshold, the customer may also be provided with another notification. In connection with responding to the high threshold notification, the user may be required to take some action to remedy the current situation such as, for example, remove or migrate one or more VM-hosted applications or otherwise take some additional appropriate action. The foregoing notifications may provide for tiered or varying severity levels and notifications provided to the user.

As a variation to that of FIG. 5, such as in connection with an initial data storage configuration (see, for example, FIG. 3, column 104 information), a customer may have all applications hosted on the data storage system (e.g., VM-hosted on the data storage system 204) without any external host or server. In connection with FIG. 5, the example 200 includes a host 210 but the host 210 may not be configured with a virtualization environment for use with techniques herein. As such, the management software 220 of the data storage system may determine, in response to the addition of storage devices, that the data storage system does not comply with the criteria and may accordingly notify the user. In response, the user may appropriately install and configure the host 210 to include virtualization software, such as including a hypervisor or VM manager. Once the user appropriately installs and configures the host 210 with the virtualization software and provides for recognition and detection of the foregoing on the host by the data storage system, the data storage system may provide for automated migration of the VM from the data storage system 204 to the host 210. It should be noted that establishing a connection from the host and data storage system for use with techniques herein for VM migration may include configuring the host or server with the VM management software so that the host and its VM configuration may be recognized by the data storage system management software 220. Subsequently, when the data storage system 204 determines through monitoring as described herein that the system 204 does not comply with specified criteria thereby indicating it is time to migrate one or more VM-hosted applications from the data storage system, the user may be prompted with a notice or suggestion to this effect and then provided with options in connection with this migration to the external host 210. For example, the user may be presented with a list, such as through a user interface (UI) display, and may then select which one or more VMs and VM-hosted applications to migrate from the data storage system. Additionally, if there are multiple external hosts or servers available as migration targets, the user may accordingly be prompted to select one such external system as the migration target to which the selected VMs are migrated. As a variation to the foregoing, the management software 220 may automatically perform such migration or removal based on a predetermined policy or parameters and may perform such migration or removal upon a determination that one or more thresholds are exceeded without further user confirmation and/or input. Thus, an embodiment may provide for varying degrees of automation for use with the techniques herein to remove and/or migrate the VM-hosted applications when one or more thresholds of the criteria are met or exceeded (e.g. indicating that the data storage system does not comply with currently specified criteria).

The migration may be automated using management software 220. Performing the migration may include, for example, pausing the VM of the data storage system 204, copying the VM and also copying the VM data (e.g., used by the VM of the data storage system and its VM-hosted application) to the external host, and then resuming execution of the VM and its VM-hosted application on the external host. As will be appreciated by those skilled in the art, the particular steps required to perform the migration may vary with the virtualized environment and available services for the virtualized environment. Furthermore, the particular steps to perform the migration may also vary with whether the VM and/or its VM data is being migrated as described elsewhere herein.

Figure 6:
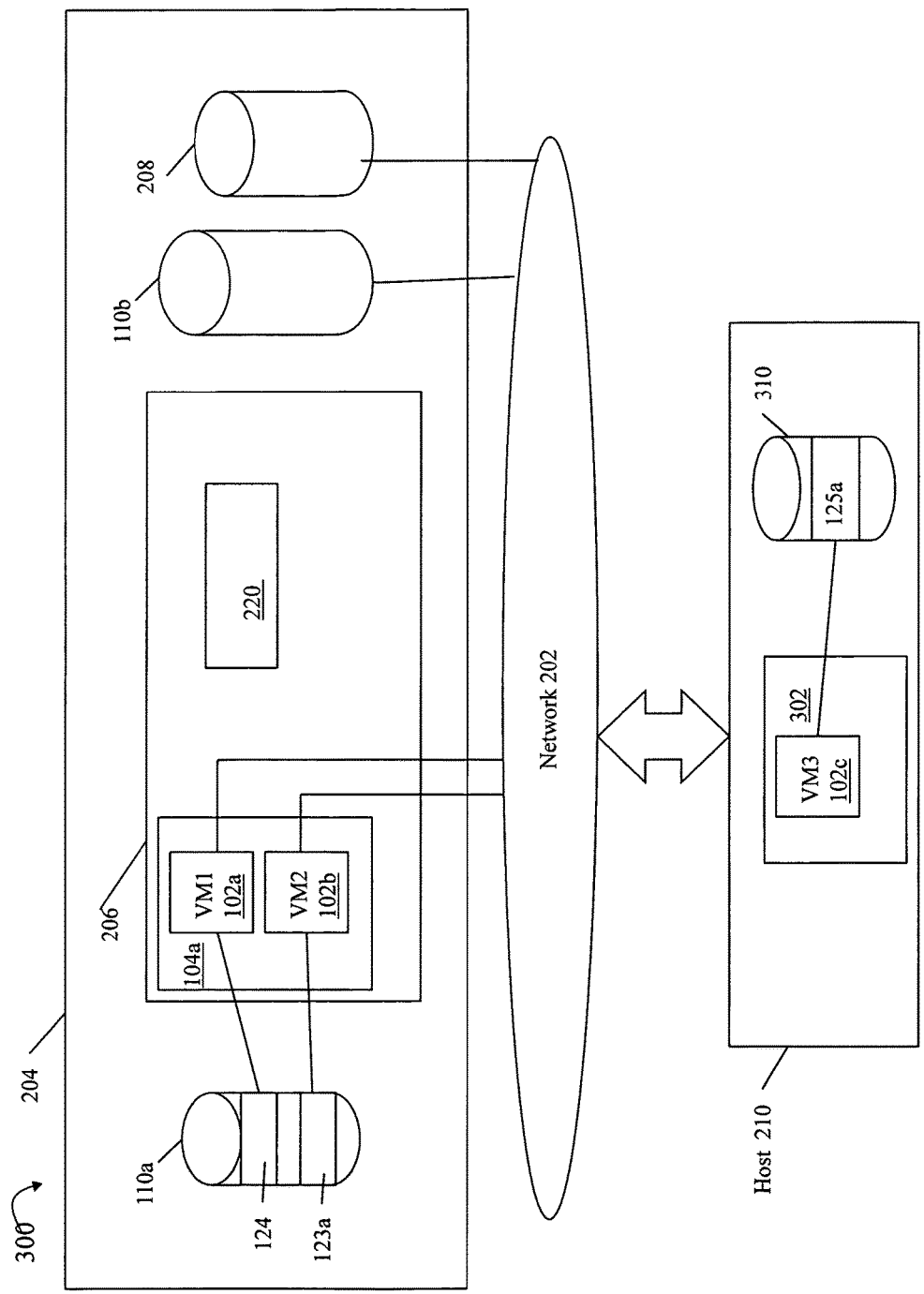

With reference back to FIG. 5, a user may select to migrate VM3 102c and its VM-hosted application from the data storage system 204 to the host 210. In connection with this example, the migration may include migrating both the VM and its VM data from the data storage system 204 to the host 210. Upon establishing a recognized connection between the host 210 and the data storage system 204 as may be detected by management software 220 when the host 210 includes an appropriately configured virtualized environment, the foregoing migration may be automatically performed such as in response to user confirmation. Referring to FIG. 6, shown is an example of the configuration after the foregoing migration regarding VM3 102c has been completed. In this example 300, the VM data 125a has been migrated or relocated from device 110b to device 310 (local to the host 210). The host 210 has been configured to include a virtualization environment including VM manager 302. The VM3 102c may be cloned or copied from the system 204 to the host 210 for execution on the host 210. Similarly, the data 125a used by VM3 102c is copied or relocated to device 310. Subsequently, the VM3 102c may resume execution but on the host 210 rather than the system 204.

It should be noted that a VM-hosted application may be migrated between a host and data storage system as needed and that such migration may include migrating an application not only from the data storage system to the host but also from the host to the data storage system as may be appropriate. For example, an application may be migrated from the host to the data storage system during off-peak usage times of the data storage system, as temporary measures such as when a software upgrade is being performed to the host, and the like. As another usage, the migration techniques herein may be used in connection with load balancing. For example, an VM-hosted application may execute on a data storage system during times of the day when the data storage system is not busy (e.g., as may be measured in connection with one or more I/O performance metrics). When the data storage system load (e.g., as measured by one or more performance metrics) is below a particular threshold indicating "not busy", such as during evening hours, on weekends, and the like, the application may execute as a VM-hosted application on the data storage system. When the data storage system is above the threshold indicating that the data storage system is busy, the VM-hosted application may otherwise not be allowed to execute on the data storage system and may rather execute on an external host as described above. For example, an application may perform a reporting such as to run daily reports. This application may also be executed as a VM-hosted application on the data storage system during the evening or other off-peak hours. Otherwise, the application may execute on the host as a VM-hosted application. In connection with the foregoing, software may be used to automatically perform the load balancing with respect to the data storage system and one or more other hosts and facilitate the automated loading and execution of the application as either the VM-hosted application on the data storage system or on an external host responsive to varying performance loads of the external host, storage system, and/or other systems.

In connection with providing data protection services, such as using replication, the management software 220 may provide an option to replicate or not replicate data of the system 204, as a primary data storage system, on another secondary remotely located data storage system for use in connection with disaster recovery. The replication may include replicating VM-related data, such as for the VM (e.g. virtual machine image and other data used in execution of the VM) and also for the VM-hosted applications as well as non-VM related data using the appropriate technologies. In this manner, the remote data storage system may be used in connection with providing the non-related VM data in the event of a disaster at the primary site as well as providing services performed by the VM-hosted applications. The foregoing may be provided to the user as single replication option or service. It should be noted that even when the VMs and VM hosted applications have been migrated to an external host from the primary data storage system, upon the occurrence of primary data storage system site disaster and also the external host, the remote data storage system may be used to execute the VM-hosted applications until the external host can be made available to host such applications. In other words, upon the occurrence of a disaster of the primary data storage system and hosts executing the applications, the single remote data storage system may be used to provide the data storage services of the primary data storage system and may also additionally and temporarily run the applications as VM-hosted applications until new hosts can be made available to run the applications.

An embodiment of a single data storage system as described herein may include multiple storage processors such as within a single data storage array. Such processor redundancy may be utilized in connection with providing a failover architecture In the event that a primary processor fails, a secondary processor may takeover and resume tasks performed by the failing primary including executing any VM-hosted applications. In this case, sufficient information regarding any VM and VM-hosted applications of the primary processor may be maintained and made accessible to the secondary processor upon failure of the primary processor. Information that may be stored for a VM may include, for example, VM state and configuration information, data regarding the particular application hosted by the VM, and the like, as described elsewhere herein. In one embodiment, the information may be stored in a memory, such as a cache, SSD (solid state storage) drive, and the like, that is shared between the primary and secondary processors. Upon failure of the primary processors, the secondary processor may utilize the cached data to resume execution of the VM and VM-hosted application of the failed primary processor. The foregoing failover includes failing over the virtualization services as well as the data storage services in connection with servicing I/O operations such as from an external host.

Figure 7:
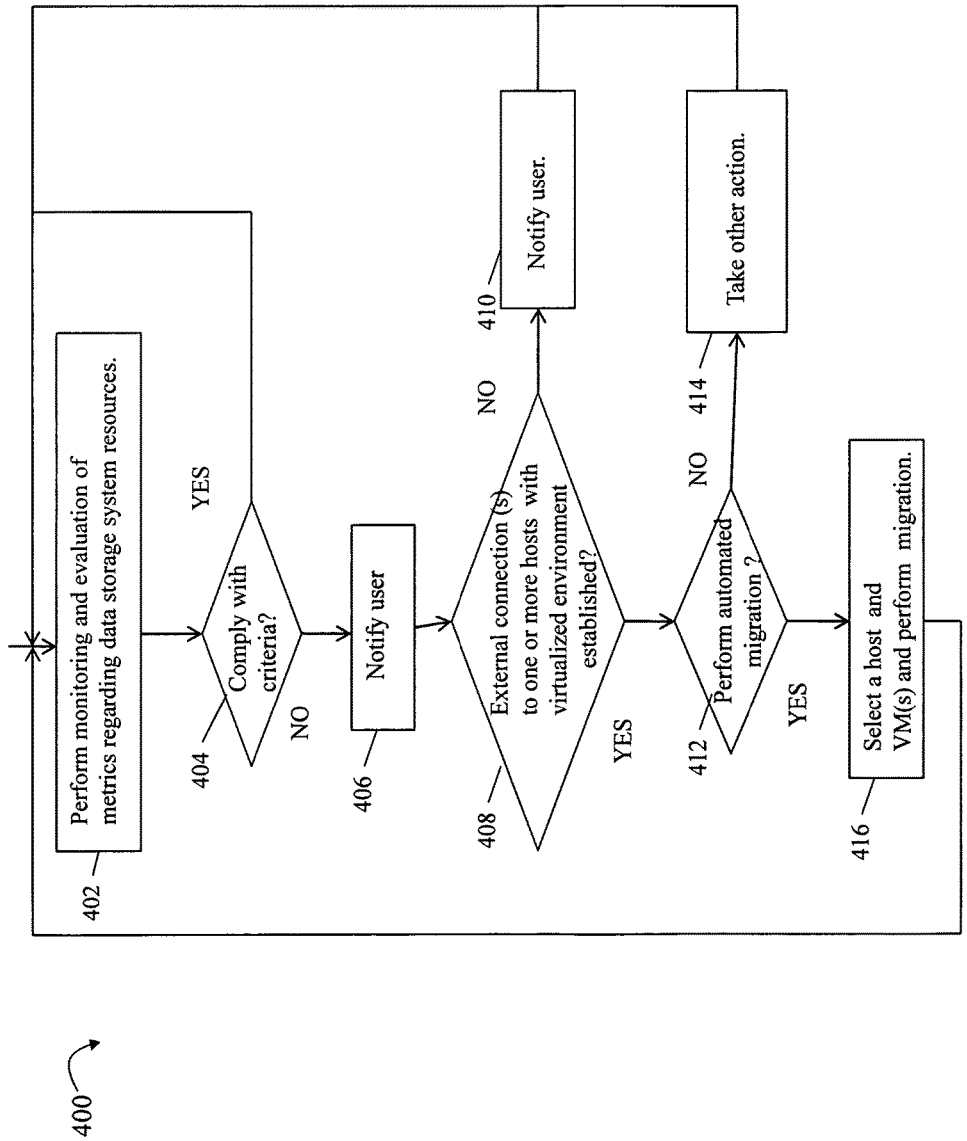
FIG. 7 is a flowchart of processing steps as may be performed in an embodiment in accordance with techniques herein.

Referring to FIG. 7, shown is a flowchart of processing steps as may be performed in an embodiment in accordance with techniques herein. The steps of the flowchart 400 summarize processing as described above. At step 402, processing may be performed in a data storage system in connection with monitoring and evaluation of metrics regarding resources of the data storage system. At step 404, a determination is made as to whether the metrics comply with specified criteria. As described above, step 404 may include comparing observed metrics to such thresholds to determine whether the thresholds are exceeded. Steps 402 and 404 may be performed periodically such as a predetermined time intervals in the data storage system. If step 404 evaluates to yes, control proceeds to step 402 to wait for the occurrence of the next time interval. It step 404 evaluates to no, control proceeds to step 406 to accordingly notify the user that the data storage system is currently not in compliance with (e.g., does not meet) the specified criteria such as may be expressed in terms of thresholds. At step 408, a determination may be made as to whether there are one or more established external connections to one or more hosts each having a virtualized environment. If step 408 evaluates to no, control proceeds to step 410 to accordingly notify the user and may suggest, for example, that the user appropriately install and configure an external host for use in connection with migrating a VM-hosted application from the storage system to the external host. Control may proceed from step 410 to step 402 to continue monitoring and notifying the user until such a host connection is established. If step 408 evaluates to yes, control proceeds to step 412 where a determination is made as to whether to perform automated migration of one or more VM-hosted applications from the data storage system to a host. Step 412 may include notifying the user and requesting confirmation to proceed with the migration. If step 412 evaluates to no, control may proceed to step 414 may another alternative action may be taken to remedy the detected non-compliance condition of the data storage system. Step 414 may include, for example, the user taking a manual action to remove the VM-hosted application from the data storage system as well as one or more other suitable actions. From step 414, control proceeds to step 402. If step 412 evaluates to yes, control proceeds to step 416 where a host and one or more VM-hosted applications are selected for migration from the data storage system, and the migration is then performed. As described herein, step 416 may include migrating the VM and the VM-hosted application and/or the VM data. Step 416 may also include performing any necessary reconfiguration of the VM, clients that utilize the VM (to correctly access the VM-hosted application at its new host), and the like.

It should also be noted that, although not included in the processing steps of 400, one or more extendable resources of the data storage system may be expanded, such as by adding more storage devices to the existing data storage configuration. The evaluation of step 404 to no may be the result of adding such storage devices thereby resulting in increased utilization of data storage system resources to process the increased I/Os. Alternatively, step 404 may evaluate to no based on an increased utilization of data storage system resources, such as CPU and memory, even without increasing the current storage capacity.

With reference to the exemplary embodiments described herein, it should be noted that the hosts or servers (e.g., 14a-14n of FIG. 1) may have a variety of one or more different roles in accordance with techniques herein. For example, as described above, the host or server may be characterized in one aspect as clients of the data storage system. Additionally, the host or server may also be a client of the VMs or use services provided by the VMs which may be hosted on the data storage system or elsewhere.

In connection with exemplary embodiments described above, the VMs may perform a variety of services such as related to non-data storage system tasks. However, VMs in an embodiment in accordance with techniques herein may also perform tasks that may be characterized as data storage system-related tasks. For example, a data storage system such as a data storage array may be produced by a vendor. A reseller of the array may have a software application providing a service such as, for example, performing management tasks for the array. The software application may be a VM-hosted application executing on a storage processor of the data storage array.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for using resources of a data storage system comprising:

configuring the data storage system to have a first data storage configuration, the first data storage configuration including a first amount of a first extendable resource and a second amount of a first non-extendable resource, wherein said first amount is a value included in a range having a minimum and a maximum whereby the minimum specifies a minimal configuration of the first extendable resource extendable up to a maximum configuration of the first extendable resource specified by the maximum, wherein said second amount of the first non-extendable resource is selected to accommodate the maximum configuration of the first extendable resource, wherein the first non-extendable resource includes any of memory and processors, and wherein an additional amount of the first non-extendable resource cannot be added to the data storage system subsequent to said configuring the data storage system to have the first data storage configuration;

configuring the data storage system having the first data storage configuration to execute a virtual machine and one or more applications executing in the context of the virtual machine, wherein the one or more applications and the virtual machine are offloaded from a host system to alternatively execute on the data storage system and perform non-data storage system tasks on behalf of the host that do not service I/O requests received by the data storage system from clients and wherein the resources of the data storage system are used to service I/O requests received by the data storage system and are also used by the one or more applications executing on the data storage system for the non-data storage system tasks;

increasing the first extendable resource, that is data storage, by adding at least one data storage device to the data storage system which increases a current total amount of configured storage capacity including both used and free storage in the data storage system;

responsive to said increasing, determining, using a processor and in accordance with one or more criteria, whether resources of the data storage system are overutilized, wherein the criteria includes a threshold storage capacity denoting a threshold amount of configured storage capacity in the data storage system, wherein said determining includes comparing the current total amount of configured storage capacity to the threshold storage capacity; and responsive to determining the resources of the data storage system are overutilized, performing, using a processor, any of removal and migration of the virtual machine from the data storage system whereby none of the one or more applications execute on the data storage system, and wherein the method further includes:

monitoring one or more metrics regarding any of data storage system resource utilization and performance, wherein said one or more metrics include I/O response time;

performing trend analysis using observed data to determine a predicted date as to when the one or more metrics will not comply with a set of one or more thresholds;

responsive to performing trend analysis, providing a user notification regarding the predicted date; and performing processing that includes any of removal and migration of the one or more applications from the data storage system by the predicted data as to when the one or more metrics will not comply with the set of one or more thresholds.

2. The method of claim 1, wherein the first data storage configuration includes a first set of data storage devices.

3. The method of claim 2, wherein the first data storage configuration is extended to include an additional set of one or more storage devices.

4. The method of claim 1, wherein the one or more metrics include at least one utilization metric regarding the first non-extendable resource of the data storage system.

5. The method of claim 4, wherein the one or more metrics includes a first metric regarding CPU utilization and a second metric regarding memory utilization and the specified criteria includes a first threshold indicating a threshold amount of CPU utilization and a second threshold indicating a threshold amount of memory utilization.

6. The method of claim 1, further comprising:

determining whether the one or more metrics comply with specified criteria; and responsive to determining that the one or more metrics do not comply with the specified criteria, performing processing including providing a notification in connection with migrating any of the virtual machine executing on the data storage system and data used by the virtual machine from the data storage system to another system external to the data storage system, and wherein the method further comprises:

receiving a first storage capacity threshold and a second storage capacity threshold greater than the first storage capacity threshold;

comparing the current total amount of configured storage capacity of storage devices of the data storage system to the first storage capacity threshold and to the second storage capacity threshold;

responsive to determining the current total amount of configured storage capacity has reached the first storage capacity threshold, issuing a warning notification and inquiring whether to migrate any of the virtual machine and data from the data storage system; and responsive to determining the current total amount of configured storage capacity has reached the second storage capacity threshold, providing a high threshold notification and requiring migration of at least one application executing in the context of the virtual machine from the data storage system to another system external to the data storage system.

7. The method of claim 6, wherein the one or more metrics include a first metric that indicates a maximum CPU utilization observed during a time period, a second metric that indicates a maximum memory utilization during the time period and the one or more metrics, a third metric that indicates an average CPU utilization observed during the time period and a fourth metric that indicates an average memory utilization observed during the time period, and the specified criteria indicates to migrate the virtual machine from the data storage system when all of the first metric, the second metric, the third metric and the fourth metric are more than specified thresholds.

8. The method of claim 7, wherein migrating any of the virtual machine executing on the data storage system and data used by the virtual machine from the data storage system to another system external to the data storage system is performed automatically in response to determining that all of the first metric, the second metric, the third metric and the fourth metric are more than the specified thresholds.

9. The method of claim 7, wherein migrating any of the virtual machine executing on the data storage system and data used by the virtual machine from the data storage system to another system external to the data storage system is performed automatically in response to determining that all of the first metric, the second metric, the third metric and the fourth metric are more than the specified thresholds and additionally receiving user confirmation to proceed with the migrating.

10. The method of claim 6, wherein migrating any of the virtual machine executing on the data storage system and data used by the virtual machine from the data storage system to another system external to the data storage system includes migrating the virtual machine for execution on a processor of another system external to the data storage system.

11. The method of claim 6, wherein said migrating any of the virtual machine executing on the data storage system and data used by the virtual machine from the data storage system to another system external to the data storage system includes migrating the virtual machine for execution on a processor of another system external to the data storage system without migrating at least a portion of data used by the virtual machine or an application executing in the context of the virtual machine.

12. The method of claim 6, wherein migrating any of the virtual machine executing on the data storage system and data used by the virtual machine from the data storage system to another system external to the data storage system includes migrating at least a portion of first data used by the virtual machine or an application executing in the context of the virtual machine to another system external to the data storage system.

13. The method of claim 6, wherein migrating any of the virtual machine executing on the data storage system and data used by the virtual machine from the data storage system to another system external to the data storage system includes migrating at least a portion of first data used by the virtual machine or an application executing in the context of the virtual machine to another system external to the data storage system without migrating the virtual machine for execution on the another system external to the data storage system.

14. The method of claim 6, wherein a connection is established between the data storage system and a host having a virtualized environment, and the method includes:

automatically detecting the connection and the virtualized environment of the host; and providing an option for automatically migrating the virtual machine to the host upon detecting the connection and the virtualized environment.

15. The method of claim 14, further comprising:
selecting one or more virtual machines currently executing on the data storage system for migration to the host, and wherein the host is selected from a plurality of hosts connected to the data storage system.

16. The method of claim 6, further comprising:
providing data protection services for the data storage system, said providing including first processing to replicate first data for the virtual machine and second processing to replicate second data not used by the virtual machine, wherein said first data includes any of an image of the virtual machine and data used to execute the virtual machine on another data storage system.

17. A non-transitory computer readable medium comprising code stored thereon for using resources of a data storage system, the non-transitory computer readable medium comprising code stored thereon that, when executed by a processor, performs a method comprising:
configuring the data storage system to have a first data storage configuration, the first data storage configuration including a first amount of a first extendable resource and a second amount of a first non-extendable resource, wherein said first amount is a value included in a range having a minimum and a maximum whereby the minimum specifies a minimal configuration of the first extendable resource extendable up to a maximum configuration of the first extendable resource specified by the maximum, wherein said second amount of the first non-extendable resource is selected to accommodate the maximum configuration of the first extendable resource, wherein the first non-extendable resource includes any of memory and processors, and wherein an additional amount of the first non-extendable resource cannot be added to the data storage system subsequent to said configuring the data storage system to have the first data storage configuration;
configuring the data storage system having the first data storage configuration to execute a virtual machine and one or more applications executing in the context of the virtual machine, wherein the one or more applications and the virtual machine are offloaded from a host system to alternatively execute on the data storage system and perform non-data storage system tasks on behalf of the host that do not service I/O requests received by the data storage system from clients and wherein the resources of the data storage system are used to service I/O requests received by the data storage system and are also used by the one or more applications executing on the data storage system for the non-data storage system tasks;
increasing the first extendable resource, that is data storage, by adding at least one data storage device to the data storage system which increases a current total amount of configured storage capacity including both used and free storage in the data storage system;
responsive to said increasing, determining, using a processor and in accordance with one or more criteria, whether resources of the data storage system are overutilized, wherein the criteria includes a threshold storage capacity denoting a threshold amount of configured storage capacity in the data storage system, wherein said determining includes comparing the current total amount of configured storage capacity to the threshold storage capacity; and
responsive to determining the resources of the data storage system are overutilized, performing, using a processor, any of removal and migration of the virtual machine from the data storage system whereby none of the one or more applications execute on the data storage system, and wherein the method further includes:
monitoring one or more metrics regarding any of data storage system resource utilization and performance, wherein said one or more metrics include I/O response time;
performing trend analysis using observed data to determine a predicted date as to when the one or more metrics will not comply with a set of one or more thresholds;
responsive to performing trend analysis, providing a user notification regarding the predicted date; and
performing processing that includes any of removal and migration of the one or more applications from the data storage system by the predicted data as to when the one or more metrics will not comply with the set of one or more thresholds.

18. The non-transitory computer readable medium of claim 17, wherein the first data storage configuration includes a first set of data storage devices.

19. The non-transitory computer readable medium of claim 18, wherein the first data storage configuration is extended to include an additional set of one or more storage devices.

20. The non-transitory computer readable medium of claim 17, wherein the one or more metrics includes a first metric regarding CPU utilization and a second metric regarding memory utilization and the specified criteria includes a first threshold indicating a threshold amount of CPU utilization and a second threshold indicating a threshold amount of memory utilization.

21. The non-transitory computer readable medium of claim 17, wherein the method further comprises:
determining whether the one or more metrics comply with specified criteria; and
responsive to determining that the one or more metrics do not comply with the specified criteria, performing processing including providing a notification in connection with migrating any of the virtual machine executing on the data storage system and data used by the virtual machine from the data storage system to another system external to the data storage system, and wherein the method further comprises:
receiving a first storage capacity threshold and a second storage capacity threshold greater than the first storage capacity threshold;
comparing the current total amount of configured storage capacity of storage devices of the data storage system to the first storage capacity threshold and to the second storage capacity threshold;
responsive to determining the current total amount of configured storage capacity has reached the first storage capacity threshold, issuing a warning notification and inquiring whether to migrate any of the virtual machine and data from the data storage system; and
responsive to determining the current total amount of configured storage capacity has reached the second storage capacity threshold, providing a high threshold notification and requiring migration of at least one application executing in the context of the virtual machine from the data storage system to another system external to the data storage system.

22. A system comprising:
at least one processor; and
a memory comprising code stored thereon that, when executed, performs a method for using resources of a data storage system comprising:
configuring the data storage system to have a first data storage configuration, the first data storage configuration including a first amount of a first extendable resource and a second amount of a first non-extendable resource, wherein said first amount is a value included in a range having a minimum and a maximum whereby the minimum specifies a minimal configuration of the first extendable resource extendable up to a maximum configuration of the first extendable resource specified by the maximum, wherein said second amount of the first non-extendable resource is selected to accommodate the maximum configuration of the first extendable resource, wherein the first non-extendable resource includes any of memory and processors, and wherein an additional amount of the first non-extendable resource cannot be added to the data storage system subsequent to said configuring the data storage system to have the first data storage configuration;
configuring the data storage system having the first data storage configuration to execute a virtual machine and one or more applications executing in the context of the virtual machine, wherein the one or more applications and the virtual machine are offloaded from a host system to alternatively execute on the data storage system and perform non-data storage system tasks on behalf of the host that do not service I/O requests received by the data storage system from clients and wherein the resources of the data storage system are used to service I/O requests received by the data storage system and are also used by the one or more applications executing on the data storage system for the non-data storage system tasks;
increasing the first extendable resource, that is data storage, by adding at least one data storage device to the data storage system which increases a current total amount of configured storage capacity including both used and free storage in the data storage system;
responsive to said increasing, determining, using a processor and in accordance with one or more criteria, whether resources of the data storage system are overutilized, wherein the criteria includes a threshold storage capacity denoting a threshold amount of configured storage capacity in the data storage system, wherein said determining includes comparing the current total amount of configured storage capacity to the threshold storage; and
responsive to determining the resources of the data storage system are overutilized, performing, using a processor, any of removal and migration of the virtual machine from the data storage system whereby none of the one or more applications execute on the data storage system, and wherein the method further includes:
monitoring one or more metrics regarding any of data storage system resource utilization and performance, wherein said one or more metrics include I/O response time;
performing trend analysis using observed data to determine a predicted date as to when the one or more metrics will not comply with a set of one or more thresholds;
responsive to performing trend analysis, providing a user notification regarding the predicted date; and
performing processing that includes any of removal and migration of the one or more applications from the data storage system by the predicted data as to when the one or more metrics will not comply with the set of one or more thresholds.

* * * * *